April 19, 1966 E. D. GEORGE 3,246,551
BIAS-CUTTING MACHINE
Filed Feb. 27, 1964
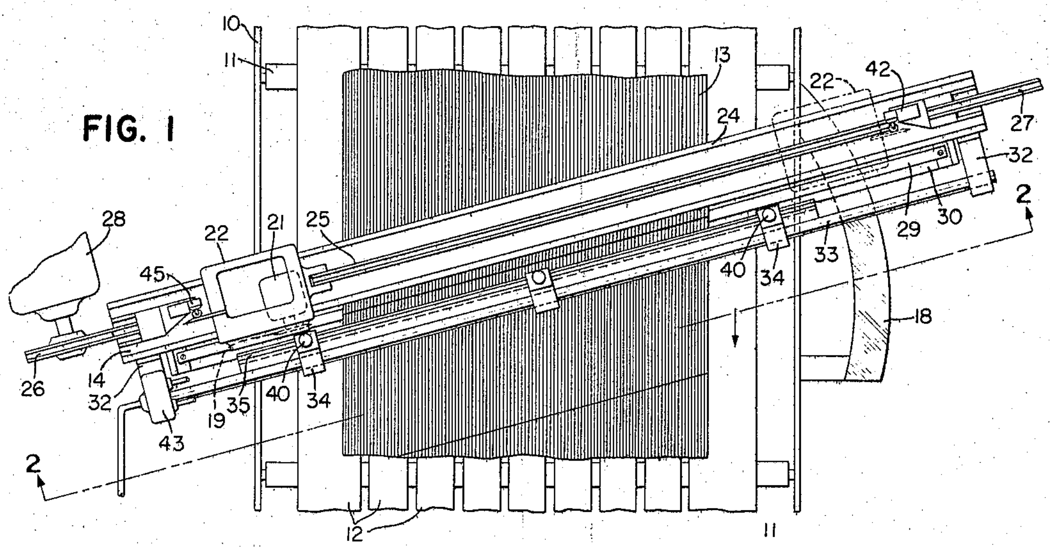
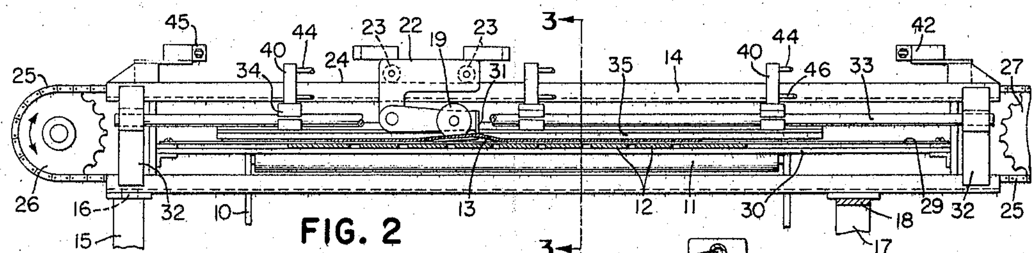
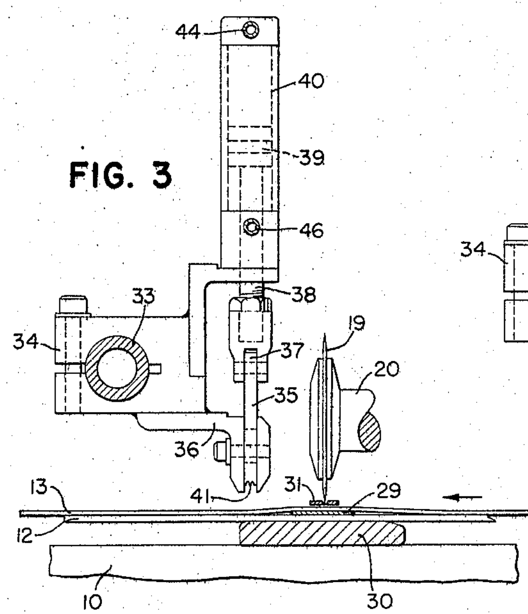
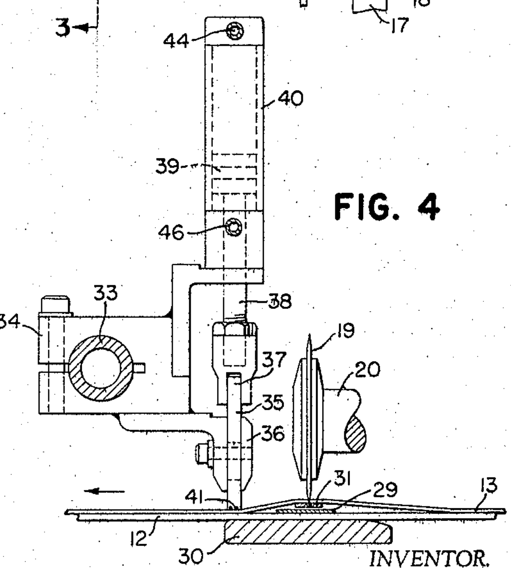
INVENTOR.
EVERETT D. GEORGE
BY
J.B. Holden
ATTORNEY 3,246,551
Patented Apr. 19, 1966

3,246,551

BIAS-CUTTING MACHINE

Everett D. George, Cuyahoga Falls, Ohio, assignor to The Goodyear Tire & Rubber Company, Akron, Ohio, a corporation of Ohio Filed Feb. 27, 1964, Ser. No. 347,723
3 Claims. (Cl. 83—155)

This invention relates to improvements in machines for cutting sheet materials and, more particularly, to machines for cutting fabric materials on the bias.

In the manufacture of pneumatic tires, the carcass is reinforced with plies of rubber-coated cords with the plies being arranged in different layers and built to tire shape in an unvulcanized condition upon a collapsible core drum. Generally, cords are arranged in two or more piles and extend diagonally from bead to bead in opposite directions so as to cross each other in adjacent plies. The cords in each ply or layer are disposed in parallel relation with no weft threads between them and are held together by skim-coating or rubber. Alternatively, the cords are held in parallel relationship by widely-spaced weft cords of relatively little strength and skim-coated with rubber. In using the word "fabric" in the specification and claims, it is intended to include either of the above types of cord fabric.

With the advent of tires having fewer plies and, therefore, cords of larger denier, the cutter of conventional horizontal bias-cutting machines tends to bias-cut in a curvilinear direction transversely of the fabric rather than in a straight line. This detrimental effect becomes more pronounced as the denier of the tire cord fabric increases.

It is an object of this invention to provide a horizontal bias-cutting machine for cutting tire cord fabric which prevents the cutter from displacing the fabric during the cutting operation and, thus, eliminates any curvature along the cut edges of the plies.

Another object of the invention is to provide a horizontal bias-cutter which not only eliminates any curvature along the cut edge of the ply but prevents or avoids sticking or adhesion of the uncut end of the ply material.

Further objects and advantages of the invention will become apparent from the following specification and drawings, in which;

FIG. 1 is a plan view with parts broken away showing the bias-cutter of this invention;

FIG. 2 is a cross-sectional view taken along the lines 2, 2 of FIG. 1;

FIG. 3 is an enlarged partial elevational view with parts broken away taken along the lines 3, 3 of FIG. 2;

FIG. 4 is a view similar to FIG. 3 with the cutter in operating position.

Referring to the drawings, the improved bias-cutting machine comprises a main frame 10 supporting a plurality of rolls 11 on which are positioned a plurality of conveyor belts 12, all driven intermittently and simultaneously for feeding a fabric sheet 13 forwardly step by step to a cutting position below the supplemental frame 14.

The supplemental frame 14 is supported at one end on a pedestal 15 on which the frame 14 is pivoted at point 16. At the opposite end of the frame 14 a pedestal 17 is provided having a suitable arcuate slide 18 on which the frame 14 is supported. Thus, the frame 14 may be positioned at different angles relative to the centerline of the belt 12.

The frame 14 supports a cutter mechanism which, for purposes of this invention, may be a rotating-cutter disc 19 secured to a shaft 20 which is suitably driven by a motor 21. The motor 21 and shaft 20 are mounted on a carriage 22 provided with a plurality of wheels 23 which engage a track member 24 of the supplemental frame 14. The carriage 22 is secured to a chain 25 extending continuously from the carriage 22 around the driven sprocket wheel 26, beneath the belt 12, around a second idler sprocket wheel 27 and then returns to the carriage 22. The sprocket wheel 26 is driven by a suitable reversible motor 28 to move the carriage 22 first in one direction during the cutting stroke and then in an oppoiste direction to return the carriage to its starting position.

A separator bar 29 and supporting bar 30 are secured at each end to the frame 14 with the base bar 30 positioned below the belt 12 and the separator bar 29 positioned above the belt 12. The fabric 13 passes over the spearator bar 29, and a guide shoe 31 secured to the carriage passes between the fabric 13, and the bar 29 during the cutting operation, as shown in FIG. 4 of the drawings. On return of the carriage to starting position, the guide shoes passes over the fabric 13, as shown in FIG. 3 of the drawings.

At each end of the frame 14 a bracket 32 is provided supporting a frame member 33 extending across belts 12 parallel and coextensive to the frame 14. A plurality of brackets 34 are secured to the member 33 for supporting a vertical reciprocating clamp member 35. The clamp member 35 passes through a pair of fixed guides 36. The upper end 37 of member 35 is secured to the rod 38 of pistons 39 actuated within cylinders 40. Preferably, the lower end of the clamp 35 is serrated or grooved at the clamping surface 41 which extends parallel to and in alignment over the bar 30.

With the belt 12 in stationary position, the carriage moves from the position shown in dotted lines in FIG. 1, and limit switch 42 is actuated which operates a valve 43 permitting a fluid under pressure to enter the upper portion of the cylinder 40 through the pipes 44 thereby actuating the clamps in a downward direction into engagement with the fabric 13. The face 41 of the clamps engages the fabric and clamps it against the belt 12 which, in turn, is supported by the bar 30, as shown in FIG. 4, directly below the clamp face 41. As the carriage reaches the position shown in solid lines in FIG. 1, the limit switch 45 is actuated which reverses the motor 28 and actuates the valve 43 so that fluid under pressure is emitted into pipes 46 to thereby raise the clamping member 35. It is seen that during the cutting operation, ply 13 is clamped to the belts 12 on the ply take-away side of the cutting path of the cutter 19 and adjacent the bar 29. Therefore, any tendency of the ply 13 to adhere to the bar 29 is avoided, and as the belt 12 is actuated to move the uncut end of the ply 13 into position for the next cut, the uncut end of ply 13 is free to move without interference.

Although this invention has been described with respect to a rotating cutter, mounted on a reciprocating carriage, it is not intended that the invention is applicable solely to the particular type of cutter shown and described.

While certain representative embodiments and details have been shown for the purpose of illustrating the invention, it will be apparent to those skilled in this art that various changes and modifications may be made therein without departing from the spirit or scope of the invention.

What is claimed is:

1. A fabric-cutting machine comprising a substantially horizontal belt for feeding fabric step by step into cutting position, an adjustable supporting frame extending across said belt and fabric, a cutter supported by said frame and movable in a cutting path across said belt, a belt-supporting bar secured to said frame and positioned beneath the belt, a clamp member movable into engagement with said fabric for clamping the fabric against said belt in a location over said supporting bar parallel and adjacent to the cutting path of said cutter, said clamp member being movable into and out of clamping position only when said belt is stationary, said clamp engaging said ply only on the take-away side of the cutting path of said cutter.

2. A fabric-cutting machine as claimed in claim 1 in which said clamp member is lowered and raised by a plurality of actuating mechanisms, said clamp member and said mechanisms being supported on a support member extending across said belts and secured to said frame.

3. A fabric-cutting machine as claimed in claim 2 in which said clamp member is supported in vertically slidable relationship and said mechanisms each include a fluid actuated cylinder, said cylinders being actuated simultaneously.

References Cited by the Examiner

UNITED STATES PATENTS

| | | | |
|---|---|---|---|
| 1,731,713 | 10/1929 | Denmire | 83—922 X |
| 1,743,059 | 1/1930 | Brown | 83—282 X |
| 1,888,754 | 11/1932 | Alexander et al. | 83—488 X |
| 2,261,837 | 11/1941 | Allen | 83—282 |
| 3,122,041 | 2/1964 | Kile et al. | 83—453 X |
| 3,138,049 | 6/1964 | Flory et al. | 83—488 X |

FOREIGN PATENTS

| | | |
|---|---|---|
| 937,148 | 9/1963 | Great Britain. |

WILLIAM W. DYER, Jr., *Primary Examiner.*